July 28, 1942.  L. C. ROTTER ET AL  2,291,563
VALVE
Filed May 12, 1941  2 Sheets-Sheet 1

Lutwin C. Rotter,
Victor G. Klein,
Inventors.
Haynes and Koenig,
Attorneys.

July 28, 1942.   L. C. ROTTER ET AL   2,291,563
VALVE
Filed May 12, 1941   2 Sheets-Sheet 2
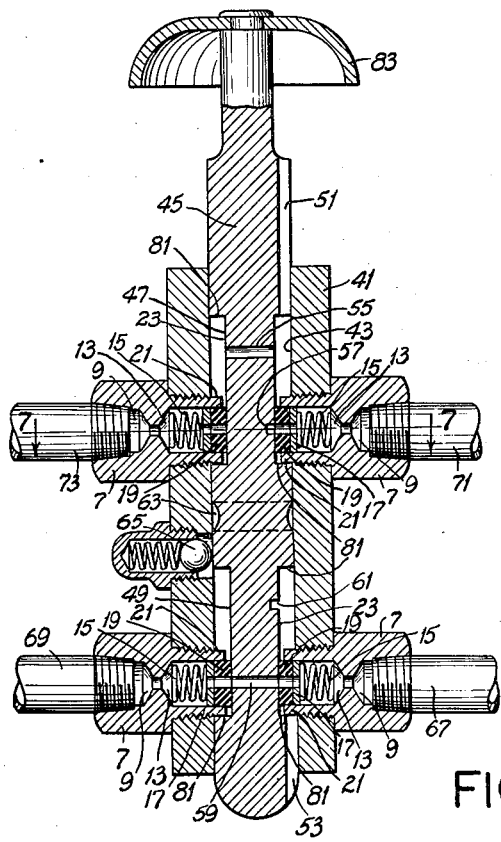
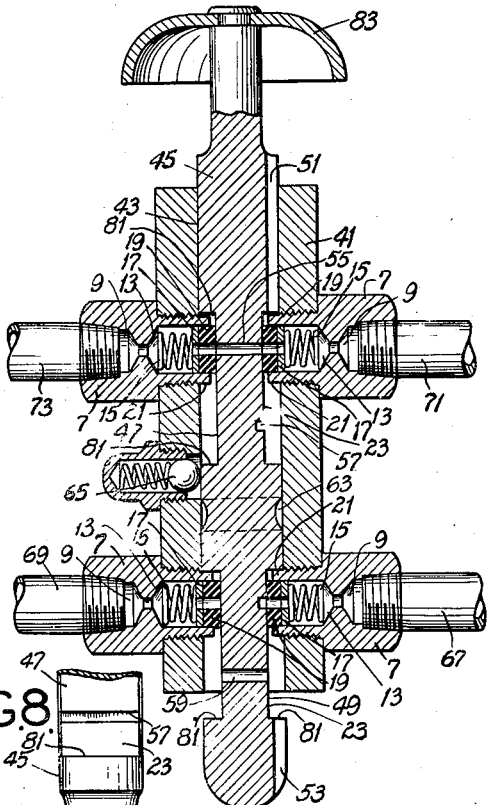
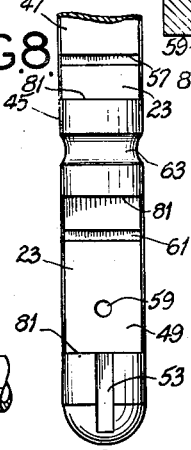
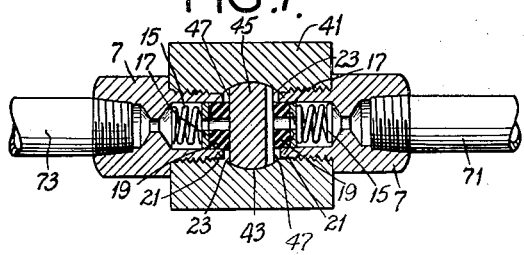

Patented July 28, 1942

2,291,563

UNITED STATES PATENT OFFICE 2,291,563

VALVE

Lutwin C. Rotter, Maplewood, and Victor G. Klein, St. Louis, Mo., assignors to Lincoln Engineering Company, St. Louis, Mo., a corporation of Missouri Application May 12, 1941, Serial No. 393,050

7 Claims. (Cl. 251—74)

This invention relates to valves, and with regard to certain more specific features, to shut-off valves.

Among the several objects of the invention may be noted the provision of a shut-off valve which may be operated by simple reciprocation; the provision of a valve of the class described in which sealing such as is obtained in a slide valve is obtained without requirement of a lapped or similar fit; and the provision of a valve of the class described which is easy, simple and reliable in operation and in which the chief wearing part is readily renewable. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings in which are shown two of various possible embodiments of the invention, Fig. 1 is a longitudinal section of one form of the valve shown in air-transmitting position;

Fig. 5 is a vertical section of a double-acting form of the invention;

Fig. 6 is a view similar to Fig. 4 showing an alternative position to that shown in Fig. 5;

Fig. 7 is a horizontal section taken on line 7—7 of Fig. 4; and,

Fig. 8 is a fragmentary right-side elevation of the valve stem of Figs. 5 and 7, also removed for purposes of a clear showing.

Similar reference characters indicate corresponding parts throughout the several views of the drawings.

Figure 4:
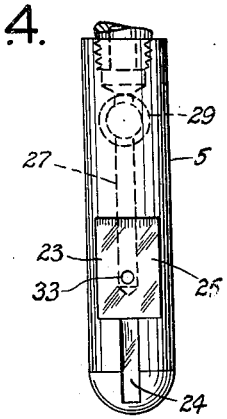
Fig. 4 is a left-side elevation of the valve stem of Figs. 1 and 2, removed for clarity.

An air control valve performing functions of the general type that the valve herein performs is shown in the United States patent application of Frank S. Barks et al., Serial No. 334,422, filed May 10, 1940, for Reel. Heretofore, valves of this type have been either of the poppet type, such as shown in Fig. 4 of said application, or of the lapped slide valve type, such as shown in Fig. 8. Poppet valves have the disadvantage that foreign material may easily become lodged upon their seats causing leakage, and slide valves have the disadvantage that they must be lapped for a sealing fit, or packed by excessively complicated peripheral means. The present valve avoids these and other disadvantages.

Figure 1:
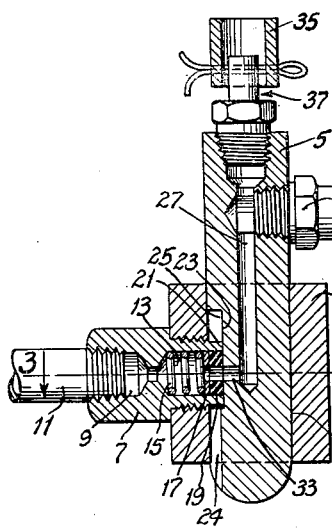

Referring now more particularly to Fig. 1, there is shown at numeral 1 a valve body which is cylindrically bored as indicated at 3. In the bore 3 is a sliding cylindric valve stem 5. The fit between the body 1 and the valve stem 5 needs not to be very close, that is, it needs not to be lapped as heretofore. Thus the stem 5 slides freely in the body 1.

Threaded in laterally from the side of body 1 is a nipple 7, the outlet 9 of which is coupled to an outlet pipe 11. This nipple is hollow, or cup-shaped on the inside, as indicated at 13, for the reception of a coil spring 15. Spring 15 reacts against one end of the hollow, cup-shaped portion 13 and pushes at the opposite end against a metal pressure washer 17. In front of, and pushed by, the washer 17 is a sealing gasket 19, preferably composed of synthetic rubber or the like which will resist attack of oil and other substances which occur in air lines.

The cupped part of nipple 7 extends inward as indicated at 21, flush with a longitudinal depressed facing 25 cut into the stem 5. This cup-shaped extension 21 holds the packing washer 19 and also prevents the stem 5 from turning. It also permits reciprocation of the valve. The spring 15 biases the packing washer 19 from the cup and against the surface 23 to effect a seal. It also seals radially in the cup under inside and endwise pressure.

Figure 2:
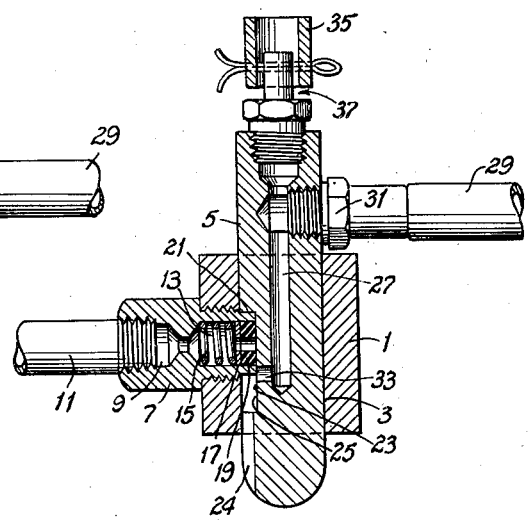
Fig. 2 is a view similar to Fig. 1, but showing the valve in release position.

Interiorly the valve stem 5 is provided with a central passage 27 which conveys air from a flexible pipe 29 connected at 31. The hollow portion 27 has an outlet 33, which, in the position of the valve shown in Fig. 1, transmits air through the packing washer 19 and hence to the pipe 11. When the valve is pushed down, as indicated in Fig. 2, its outlet 33 moves out of alignment with the packing 19 and over the edge of cup 21. This permits exhaust of air through the space left by flat 25 and a slot 24. The hole through the packing washer 19 is sealed by the flat 25.

The flat 25 communicates with the exterior of the valve through a groove 24. It is to be seen that the cup extension 21 adjacent to the flat 23 is engaged by the portions adjacent the flat 23 to form limiting stops. This provides a simple way of forming stops for limiting the valve motion.

The valve is controlled from a member 35 which is connected at 37.

No sealed fit is necessary between the body 1 and the valve stem 5, since the seal is effected between the surface 23, the packing washer 19 and the inside of the end of the cup 21. The simplicity of the packing material (simply the resilient washer 19) makes the construction quite economical and at the same time it is very reliable. Even though something should go wrong with the packing washer 19, it is quite easy to remove, since all that is necessary for the operator to do is to unscrew the nipple 7 and replace the washer. Its replacement cost is negligible.

In Figs 5-8 is shown another form of the invention, in which no flexible connection needs to be made to the valve stem. A body 41 is provided with a cylindric bore 43 for a valve stem 45. This stem has two reduced double flat portions 47 and 49. At all other points the stem is cylindric and has a sliding but non-sealed fit with respect to the body 41. The reduced double flats 47 and 49 are made by milling opposed parallel faces, which provides for insertion of extensions 21 of oppositely paired nipples 7, which carry the valve packing parts corresponding to the parts already described. Similar reference characters indicate this.

The upper flats 47 communicate with the atmosphere through an axial slot 51, and the lower flats 49 communicate with the atmosphere through an axial slot 53.

A port 55 passes between the upper flats 47 and on one flat 47 is a slot 57.

A port 59 also passes between the lower flats 49 and there is also a slot 61 on one flat 49. A central circular groove 63 cooperates with a biased detent ball 65 normally to hold the parts midway between the positions shown in Figs. 5 and 6. This is the non-transmitting position.

Operation of the alternative embodiment is as follows:

When the valve stem 45 is pulled up at handle 83, a lower outlet 67 is placed in communition with a lower inlet 69 through the cross port 59 which aligns with the opposite lower washers 19. At this time, an upper outlet 71 is cut off from an upper inlet 73, and is placed in communication with the atmosphere through the slot 57, reduced portion 47, and the groove 51 (see also Fig. 7).

When the parts are in the position shown in Fig. 6, the upper outlet 71 and the upper inlet 73 are in communication; whereas the lower outlet 67 is out of communication with the lower inlet 69 and is in communication with the atmosphere through the groove 61, reduced portion 49, and groove 53.

Figure 3:
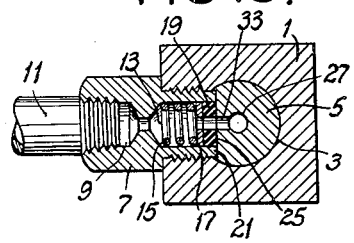
Fig. 3 is a horizontal section taken on line 3—3 of Fig. 1.

A difference between the form of the invention shown in Figs. 1-3 and that shown in Figs. 5-8 is that in the former case the feed for the valve is through the valve stem, requiring a flexible inlet pipe 29; whereas in the latter case the feed for each valve is through the valve body. In the case of Figs. 5-8, the valve stem is substantially completely balanced, so far as static pressures are concerned.

The extensions 21 into the reduced portions of the valve stem serve to be engaged by the adjacent portions of the valve stem to act as limiting stops, as indicated. Thus, the ends of the depressions formed by the flats 25 may be referred to as stops 81 which limit motion of either form of the valve upon engagement with one of the cup-shaped portions 21.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A slide valve comprising a hollow cylindric body, a cylindric valve stem loosely sliding therein, said valve stem having a depressed flat portion limited in axial length to form endwise stops, outlet means associated with the body portion and having an open cup-shaped portion directed toward said flat portion and engageable by said stops, a packing washer in the open end of said cup-shaped portion, spring means in said cup-shaped portion and behind the packing washer biasing it toward said flat portion, said valve stem having a fluid-transmitting opening movable into and out of alignment with respect to said washer when the valve is moved the limited amount permitted by engagement of the stops with said cup-shaped extension.

2. A slide valve comprising a hollow cylindric body, a cylindric valve stem loosely sliding therein, said valve stem having a depressed flat portion limited in axial length to form endwise stops, outlet means associated with the body portion and having an open cup-shaped portion directed toward said flat portion and engageable by said stops, a packing washer in the open end of said cup-shaped portion, spring means in said cup-shaped portion and behind the packing washer biasing it toward said flat portion, said valve stem having a fluid-transmitting opening movable into and out of alignment with respect to said washer when the valve is moved the limited amount permitted by engagement of the stops with said cup-shaped extension, and an axial release passage in the stem from the depressed flat portion to atmosphere for releasing fluid when said opening in the stem is out of alignment with the washer.

3. A slide valve comprising a hollow cylindric body, a cylindric valve stem loosely sliding therein, opposite flat portions on said valve stem limited in axial length, opposite cup-shaped means associated with the body portion and having their open ends directed toward said flat portions, packing washers in the ends of said cup-shaped portions, spring means in said cup-shaped portions and behind the packing washers and biasing them toward one another and toward said flat portions, said valve stem having a fluid-transmitting opening movable into and out of alignment with respect to said washers when the valve is moved the limited amount permitted by said cup-shaped extension.

4. A slide valve comprising a hollow cylindric body, a cylindric valve stem loosely sliding therein, opposite flat portions on said valve stem limited in axial length, opposite cup-shaped means associated with the body portion and having their open ends directed toward said flat portions, packing washers in the ends of said cup-shaped portions, spring means in said cup-shaped portions and behind the packing washers and biasing them toward one another and toward said flat portions, said valve stem having a fluid-transmitting opening movable into and out of alignment with respect to said washers when the valve is moved the limited amount permitted by said cup-shaped extension, one flat having a relief portion and movable into alignment with one washer when said opening is out of alignment.

5. A valve comprising a cylindric body portion, a cylindric valve stem fitting loosely and sliding therein, said stem being hollow and forming a fluid inlet, said stem also having a flattened portion and a communication with the flattened portion from the hollow portion, the ends of the flat portion forming limiting stops, a nipple intersecting said body portion and forming a cup extending therein to cooperate with said flat portion, packing means in the end of the cup, a spring in the cup biasing the packing means against the flat portion, said body portion having an axial communication between the flat portion and the exterior for release means.

6. A valve comprising a cylindric body portion, a cylindric valve stem loosely fitting and sliding in said body portion, said stem having a reduced portion forming two oppositely located flats, a cross connection for fluid at one end of said flats and a release connection at the other end and on one side, said body portion also having an outlet from the flat side corresponding to said connections, coaxial cup-shaped members directed toward one another and extending into said body portion and having ends adjacent said flats respectively, packing washers in said cup-shaped members, and springs in said cup-shaped members biasing said packing means toward one another and against the opposite flats, said stem being movable to a position where said cross connection communicates between the packing washers or to an alternative position wherein said release connection communicates with one of the washers only for relief purposes.

7. A slide valve comprising a hollow cylindric body, a cylindric valve stem sliding therein, said valve stem having a depressed flat portion limited in axial length to form endwise stops, fluid-transmitting means associated with the body portion and having an open cup-shaped portion directed toward said flat portion and engageable by said stops, and fluid-transmitting packing means in the open end of said cup-shaped portion including resilient means for biasing the same toward said flat portion, said valve stem having a fluid-transmitting opening movable into and out of alignment with respect to said washer when the valve is moved the limited amount permitted by the engagement of the stops with said cup-shaped extension.

LUTWIN C. ROTTER.
VICTOR G. KLEIN.